(12) United States Patent
Tu et al.

(10) Patent No.: US 11,971,860 B2
(45) Date of Patent: Apr. 30, 2024

(54) EMBEDDED FOLDER VIEWS

(71) Applicant: Dropbox, Inc., San Francisco, CA (US)

(72) Inventors: Roger Tu, San Francisco, CA (US); Aisha Ferrazares, San Francisco, CA (US); Jennifer Lee, San Francisco, CA (US); Sang Tian, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 486 days.

(21) Appl. No.: 14/980,939

(22) Filed: Dec. 28, 2015

(65) Prior Publication Data

US 2017/0185626 A1 Jun. 29, 2017

(51) Int. Cl.
| | |
|---|---|
| *G06F 16/176* | (2019.01) |
| *G06F 16/16* | (2019.01) |
| *G06F 16/958* | (2019.01) |
| *G06F 21/62* | (2013.01) |
| *H04L 9/40* | (2022.01) |

(52) U.S. Cl.
CPC .......... *G06F 16/176* (2019.01); *G06F 16/168* (2019.01); *G06F 16/972* (2019.01); *G06F 21/6218* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,694,309 B2 | 2/2004 | Cho et al. | |
| 7,596,766 B1 | 9/2009 | Sharma et al. | |
| 7,843,454 B1 | 11/2010 | Biswas | |
| 7,873,916 B1 | 1/2011 | Chaudhri | |
| 8,205,172 B2 | 6/2012 | Wong et al. | |
| 8,370,464 B1 | 2/2013 | Chitilian et al. | |
| 8,484,561 B1 | 7/2013 | Lemonik et al. | |
| 8,549,434 B2 | 10/2013 | Ouzts et al. | |
| 9,310,981 B2 | 4/2016 | Lynch et al. | |
| 9,395,893 B1* | 7/2016 | Beausoleil | G06F 40/123 |

(Continued)

FOREIGN PATENT DOCUMENTS

JP H0696077 A 4/1994

OTHER PUBLICATIONS

Advisory Action for U.S. Appl. No. 14/085,760 dated Aug. 27, 2014, 3 pages.

(Continued)

*Primary Examiner* — Neveen Abel Jalil
*Assistant Examiner* — John J Morris
(74) *Attorney, Agent, or Firm* — DLA PIPER LLP (US)

(57) ABSTRACT

Disclosed are systems, methods, and non-transitory computer-readable storage media for providing an embedded web view of a folder in a content management system on a web page. For example, a user can request from a content management system code for embedding a web view of a content item or group of content items (e.g., folder) into a web page. After the code is embedded into the webpage, the web page can present a web view of the content item or group of content items that is dynamically updated when the content item or group of content items is updated. Thus, the user is relieved of the burden of updating the web page with new links to reflect changes in content items stored in the online content management system.

17 Claims, 17 Drawing Sheets

(56) References Cited

U.S. PATENT DOCUMENTS

| | | |
|---|---|---|
| 10,437,923 B2 | 10/2019 | Silk et al. |
| 2002/0091662 A1 | 7/2002 | Bogia |
| 2003/0105819 A1 | 6/2003 | Kim et al. |
| 2004/0172425 A1 | 9/2004 | Edelstein et al. |
| 2004/0205504 A1 | 10/2004 | Phillips |
| 2005/0033813 A1 | 2/2005 | Bhogal et al. |
| 2005/0149538 A1* | 7/2005 | Singh ................. G06F 16/972 |
| 2005/0149935 A1 | 7/2005 | Benedetti |
| 2005/0210392 A1 | 9/2005 | Koide et al. |
| 2006/0036568 A1 | 2/2006 | Moore et al. |
| 2006/0224946 A1 | 10/2006 | Barrett et al. |
| 2007/0061745 A1 | 3/2007 | Anthony et al. |
| 2007/0156670 A1 | 7/2007 | Lim |
| 2007/0233811 A1 | 10/2007 | Rochelle et al. |
| 2008/0126967 A1 | 5/2008 | Lusen et al. |
| 2008/0129757 A1 | 6/2008 | Tanaka et al. |
| 2008/0172625 A1 | 7/2008 | Montgomery et al. |
| 2008/0209363 A1 | 8/2008 | Kuroda |
| 2008/0221946 A1 | 9/2008 | Balon et al. |
| 2008/0244582 A1 | 10/2008 | Brown et al. |
| 2009/0249446 A1* | 10/2009 | Jenkins ................. G06F 9/4443 |
| | | 726/3 |
| 2009/0307622 A1 | 12/2009 | Jalon et al. |
| 2010/0050114 A1 | 2/2010 | Braun et al. |
| 2010/0174678 A1 | 7/2010 | Massand |
| 2010/0251085 A1 | 9/2010 | Zearing et al. |
| 2011/0040610 A1 | 2/2011 | Araiza-Boys |
| 2011/0209048 A1 | 8/2011 | Scott et al. |
| 2011/0252299 A1 | 10/2011 | Lloyd et al. |
| 2011/0252300 A1 | 10/2011 | Lloyd et al. |
| 2011/0258540 A1 | 10/2011 | Ueda et al. |
| 2011/0271220 A1 | 11/2011 | Remsberg et al. |
| 2011/0283242 A1 | 11/2011 | Chew et al. |
| 2011/0296351 A1 | 12/2011 | Ewing, Jr. et al. |
| 2011/0307772 A1 | 12/2011 | Lloyd et al. |
| 2012/0030626 A1 | 2/2012 | Hopkins et al. |
| 2012/0110515 A1* | 5/2012 | Abramoff ......... G06F 17/30994 |
| | | 715/854 |
| 2013/0002796 A1 | 1/2013 | Hiller et al. |
| 2013/0013560 A1* | 1/2013 | Goldberg ............. G06F 16/178 |
| | | 707/634 |
| 2013/0042201 A1 | 2/2013 | Sandman, Jr. et al. |
| 2013/0097481 A1 | 4/2013 | Kotler et al. |
| 2013/0097490 A1 | 4/2013 | Kotler et al. |
| 2013/0111368 A1 | 5/2013 | Laughlin |
| 2013/0124955 A1 | 5/2013 | Goel et al. |
| 2013/0218845 A1 | 8/2013 | Kleppner et al. |
| 2013/0219256 A1 | 8/2013 | Lloyd et al. |
| 2013/0232149 A1 | 9/2013 | Smith et al. |
| 2013/0262373 A1 | 10/2013 | Rampson et al. |
| 2013/0262975 A1 | 10/2013 | Rochelle et al. |
| 2013/0263289 A1 | 10/2013 | Vijayan et al. |
| 2013/0291126 A1 | 10/2013 | Thomson |
| 2013/0339830 A1 | 12/2013 | Yuan et al. |
| 2013/0346849 A1* | 12/2013 | Krueger ................. G06F 40/14 |
| | | 715/234 |
| 2014/0047349 A1 | 2/2014 | Kulkarni et al. |
| 2014/0067865 A1* | 3/2014 | Kirigin ............... G06F 21/6218 |
| | | 707/783 |
| 2014/0123002 A1 | 5/2014 | Wessling et al. |
| 2014/0172799 A1 | 6/2014 | Dorman |
| 2014/0188869 A1* | 7/2014 | Beckmann .............. G06F 16/22 |
| | | 707/736 |
| 2014/0189483 A1 | 7/2014 | Awan et al. |
| 2014/0207867 A1 | 7/2014 | Kotler et al. |
| 2014/0244653 A1 | 8/2014 | Plotkin et al. |
| 2014/0258972 A1* | 9/2014 | Savage ..................... G06F 8/30 |
| | | 717/106 |
| 2014/0310601 A1 | 10/2014 | Matejka et al. |
| 2014/0337278 A1* | 11/2014 | Barton ................ G06F 16/1873 |
| | | 707/608 |
| 2014/0359533 A1 | 12/2014 | Hahm et al. |
| 2014/0372852 A1 | 12/2014 | Rothschiller et al. |
| 2015/0082198 A1 | 3/2015 | Destagnol et al. |
| 2015/0095839 A1 | 4/2015 | Hombert |
| 2015/0127603 A1 | 5/2015 | Cohen et al. |
| 2015/0134600 A1 | 5/2015 | Eisner et al. |
| 2015/0135300 A1 | 5/2015 | Ford |
| 2015/0195330 A1 | 7/2015 | Lee |
| 2015/0199270 A1 | 7/2015 | Day-Richter et al. |
| 2015/0199316 A1 | 7/2015 | Cairns et al. |
| 2015/0199325 A1 | 7/2015 | Friske et al. |
| 2015/0199328 A1 | 7/2015 | Danziger et al. |
| 2015/0281148 A1 | 10/2015 | Masterson et al. |
| 2015/0310188 A1 | 10/2015 | Ford et al. |
| 2016/0026815 A1* | 1/2016 | Staley ................. G06F 21/6218 |
| | | 707/785 |
| 2016/0261577 A1 | 9/2016 | Chang et al. |
| 2017/0337174 A1 | 11/2017 | Nault |
| 2019/0138588 A1 | 5/2019 | Silk et al. |

OTHER PUBLICATIONS

Altwood J., "Embed Drive Folders Into your Google Sites," Uploaded Mar. 19, 2013, retreived from https://www.youtube.com/watch?v=SDqP4FkoT81, pp. 1-13.

Bradley T., "Collaborate in Real-Time with Google Docs," Jul. 1, 2010 retrieved from https://www.pcworld.com/article/200269/collaborate_in_real_time_with_google_docs.html, on Sep. 27, 2019, 5 Pages.

"Embedded Drive Folders," Aug. 21, 2013, retrieved from https://web.archive.org/web/20130821 033849/http:l/sandbox.atwoodphoto.com/embedded-drive-folders on Sep. 6, 2018, pp. 1-5.

Final Office Action for U.S. Appl. No. 14/085,760 dated Jun. 13, 2014, 25 pages.

Final Office Action from U.S. Appl. No. 15/802,458, dated Dec. 4, 2019, 60 pages.

Final Office Action from U.S. Appl. No. 16/010,836, dated Mar. 24, 2020, 30 pages.

Google, "A thumbnail is worth about a hundred words," Jan. 26, 2010, 2 pages.

Google Apps for Word Press, "Google Drive Embedder," Nov. 10, 2014, Youtube, pp. 1-8, Retrieved: https://www.youtube.com/watch?v=wcpjcFJIOko.

Needleman R., "Don't call it a wiki: Google Sites finally launches," Feb. 27, 2008, retrieved from https://www.cnet.com/news/dont-call-it-a-wiki-google-sites-finally-launches/, on Sep. 27, 2019, 4 Pages.

Non-Final Office Action from U.S. Appl. No. 15/802,458, dated May 13, 2020, 71 pages.

Non-Final Office Action from U.S. Appl. No. 16/010,836, dated Oct. 2, 2019, 29 pages.

Notice of Allowance for U.S. Appl. No. 14/085,760 dated Sep. 22, 2014, 12 pages.

Office Action for U.S. Appl. No. 14/085,760 dated Jan. 30, 2014, 16 pages.

Office Action for U.S. Appl. No. 14/820,510 dated Aug. 25, 2016, 36 pages.

Office Action for U.S. Appl. No. 14/820,510 dated Feb. 26, 2016, 34 pages.

Office Action from U.S. Appl. No. 15/802,457, dated Jan. 26, 2018, 15 pages.

Office Action from U.S. Appl. No. 15/802,457, dated Jul. 5, 2018, 16 pages.

Wylie J., "Why the Folder Gadget Beats Attachments in Google Sites," Feb. 16, 2014, retrieved from https://jonathanwylie.com/2014/02/16/why-the-folder-gadget-beats-attachments-in-google-sites/ on Sep. 6, 2018, pp. 1-12.

Gookin, D., "Microsoft Word 2016 for Professionals for Dummies," John Wiley & Sons, Incorporated, First Edition, Jul. 28, 2016, 75 pages.

International Search Report and Written Opinion for PCT Application PCT/IB2018/048598 dated Dec. 19, 2018, 19 pages.

McFedries P., "Teach Yourself Visually Excel 2016," Chapter 14, retrieved from safaribooksonline.com, Oct. 2015, 52 pages.

"Teach Excel, Excel Tips 15-Add Comments, Remove Comments, Find Comments, and Edit Comments in Excel 2007," a YouTube

(56) References Cited

OTHER PUBLICATIONS

Video found at https://www.youtube.com/watch?v=WacPt3VxxEg, YouTube, Nov. 1, 2009, pp. 1-13.
Wikipedia, "Collaborative software," 2017, retrieved from the internet URL: https://en.wikipedia.org/w/index.php?title=Collaborative_software&oldid=807413658 on Oct. 12, 2018, 8 pages.
Wikipedia, "Content management system," 2017, retrieved from the internet URL: https://en.wikipedia.org/w/index.php?title=Content_management_system&oldid=807686694 on Oct. 12, 2018, 3 pages.
Wikipedia, "Microsoft Office 2016," 2017, retrieved from the internet URL:https://en.wikipedia.org/w/index.php?title=MicrosoftOffice2016&oldid+806196996 on Oct. 12, 2018, 7 pages.
Non-Final Office Action for U.S. Appl. No. 16/352,428 dated Oct. 7, 2020, 11 pages.
Office Action for Japanese Application No. 2020-511313 dated Nov. 13, 2020, 7 pages.
Udemy Media, This is Convenient! How to Convert from Word to Excel and Excel to Word [online], Aug. 3, 2016, retrieved from https://udemy.benesse.co.jp/office-enhance/microsoft-office/change-word-into-excel on Nov. 5, 2020, 23 pages.
Anonymous, "Word Real-Time Co-Authoring-A Closer Look," retrieved from https://www.microsoft.com/en-us/microsoft-365/blog/2015/10/30/word-real-time-co-authoring-a-closer-look/, XP055702497, Oct. 30, 2015, 5 pages.
Communication pursuant to Article 94(3) EPC for European Application No. 18778618.1 dated Oct. 22, 2020, 9 pages.
Final Office Action from U.S. Appl. No. 15/802,458, dated Oct. 27, 2020, 66 pages.
Advisory Action from U.S. Appl. No. 15/802,458, dated Feb. 2, 2021, 3 pages.
Final Office Action from U.S. Appl. No. 15/802,458, dated Jul. 28, 2021, 67 pages.
Final Office Action from U.S. Appl. No. 16/352,428, dated Aug. 23, 2021, 17 pages.
Final Office Action from U.S. Appl. No. 16/352,428, dated Jan. 28, 2021, 13 pages.
Non-Final Office Action from U.S. Appl. No. 15/802,458, dated Apr. 13, 2021, 64 pages.
Non-Final Office Action from U.S. Appl. No. 16/352,428, dated Apr. 1, 2021, 14 pages.
Notification of Reason for Refusal for Japanese Application No. 2020511313 dated Apr. 9, 2021, 5 pages.
Summons to Attend Oral Proceedings Pursuant to Rule 115(1) EPC for European Application No. 18778618.1 dated Mar. 23, 2021, 11 pages.
Gookin D., "Microsoft Word 2016 For Professionals Dummies" 2016, 75 pages.
Non-Final Office Action from U.S. Appl. No. 16/352,428, dated Dec. 20, 2021, 18 pages.
Notice of Allowance from U.S. Appl. No. 15/802,458, dated Apr. 11, 2023, 10 pages.
Notice of Allowance from U.S. Appl. No. 15/802,458 dated May 17, 2023, 3 pages.

* cited by examiner

FIG. 3 www.school.com/CS101

Lecture Notes

| Name | Description | Size | Modified |
|---|---|---|---|
| Lecture notes 1 | Description of lecture notes 1... | 228.34 KB | • • • |
| Lecture notes 2 | Description of lecture notes 2... | 78.54 KB | 1 hrs ago |
| Lecture notes 3 | Description of lecture notes 3... | 137.23 KB | 3 hrs ago |

Download as zip
Save to my account
Join published folder

FIG. 7

| Lecture Notes | | | | |
|---|---|---|---|---|
| Name | Description | Size | Modified | |
| ☐ Lecture notes 1 | Description of lecture notes 1... | 228.34 KB | 2 hrs ago | |
| ☐ Lecture notes 2 | Description of lecture notes 2... | 78.54 KB | 1 hrs ago | |
| ☐ Lecture notes 3 | Description of lecture notes 3... | 137.23 KB | 3 hrs ago | |
| ☐ Exercises Folder | - | - | - | | www.school.com/CS101

| Lecture Notes | | | |
|---|---|---|---|
| Name | Description | Size | Modified |
| ☐ Exercise 1 | Description of exercise 1... | 228.34 KB | 2 hrs ago |
| ☐ Exercise 2 | Description of exercise 2... | 78.54 KB | 1 hrs ago |
| ☐ Exercise 3 | Description of exercise 3... | 137.23 KB | 3 hrs ago | www.school.com/CS101

1000
1002

EMBEDDED FOLDER VIEWS

BACKGROUND

The Internet is the modern medium for sharing information. Bloggers express opinions in blogs. Teachers share class materials on class web pages. To share information, these Internet users typically create a web page and generate content to present on the web page. The content can be text, images, links to files, or links to other websites, for example. When the user wishes to update the content on their webpage, the user often must spend time personally updating the web page content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing an embedded web view of a folder in a content management system on a web page. For example, a user can have an account with an online content management system. The user's account can include content items (e.g., documents, images, files, folders, etc.). The user may wish to publish the content items stored in the content management system so that other Internet users can access the content items through the web page. Rather than creating individual links to content items on the user's web page, the user can request from the content management system code for embedding a web view of a content item into a web page. After the code is embedded into the webpage, the web page can present a web view of the content item or group of content items that is dynamically updated when the content item or group of content items is updated. Thus, the user is relieved of the burden of updating the web page with new links to reflect changes in content items stored in the online content management system.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 3 illustrates an example graphical user interface presenting a web page having content linked using traditional mechanisms;

FIG. 7 illustrates an example graphical user interface that includes an embedded web view of a folder managed by the content management system;

FIG. 9 illustrates an example graphical user interface for navigating subfolders in the folder web view;

FIG. 10 illustrates an example graphical user interface for presenting a web view of a subfolder;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatically and dynamically updating content on web pages.

Figure 1:
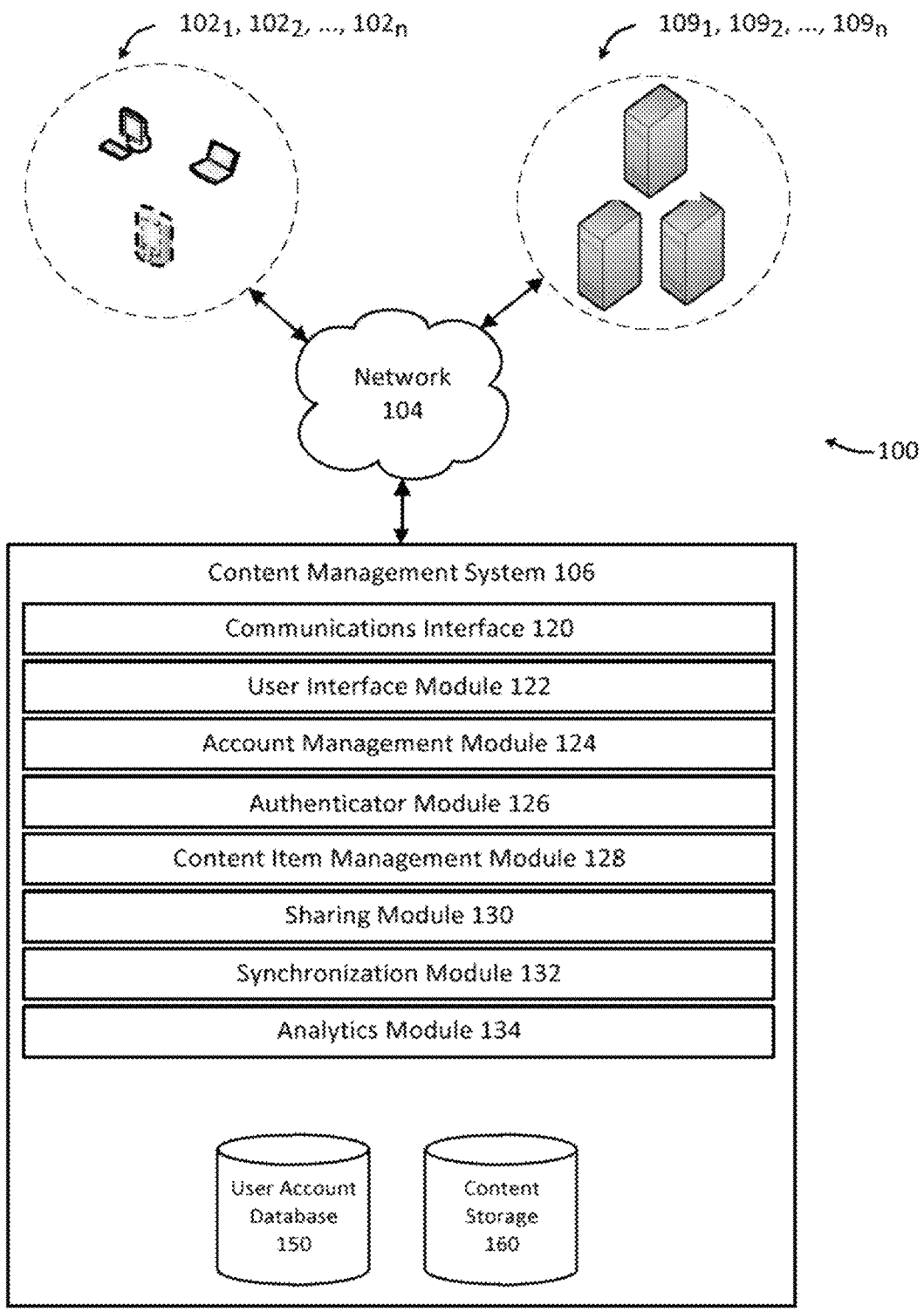
FIG. 1 shows an example configuration of devices and a network in accordance with some embodiments.

With respect to implementing various embodiments of the disclosed technology, an example system configuration 100 is shown in FIG. 1, wherein electronic devices communicate through a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 using a client-side application installed on client device $102_i$. In some embodiments, the client-side application can include a content management system specific component. For example, the component can be a stand-alone application, one or more application plug-ins, and/or a browser extension. However, the user can also interact with content management system 106 using a third-party application, such as a web browser, that resides on client device $102_i$ and is configured to communicate with content management system 106. In either case, the client-side application can present a user interface (UI) for the user to interact with content management system 106. For example, the user can interact with the content management system 106 using a client-side application integrated with the file system or through a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 through network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible through one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, using a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content through a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

In some embodiments, user interface module 122 can generate code that can be embedded in other web pages (e.g., third party webpages) to provide a web view or embedded web interface to content items (e.g., folders, documents, images, files, etc.) managed by content management system 106. Changes or updates to content in the content storage 160, such as uploading a new version of a content item, can be reflected in the web view embedded in the third party web pages. For example, the web view of the folder embedded in the third party web pages can be automatically and dynamically updated to reflect changes made to the content items associated with the web view in content management system 106 without requiring a user to make any modifications to the third party web page.

Content management system 106 can include a communications interface 120 for interfacing with various client devices 102, and can interact with other content and/or service providers $109_1$, $109_2$, ..., $109_n$ (collectively "109") through an Application Program Interface (API). Certain software applications can access content storage 160 through an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
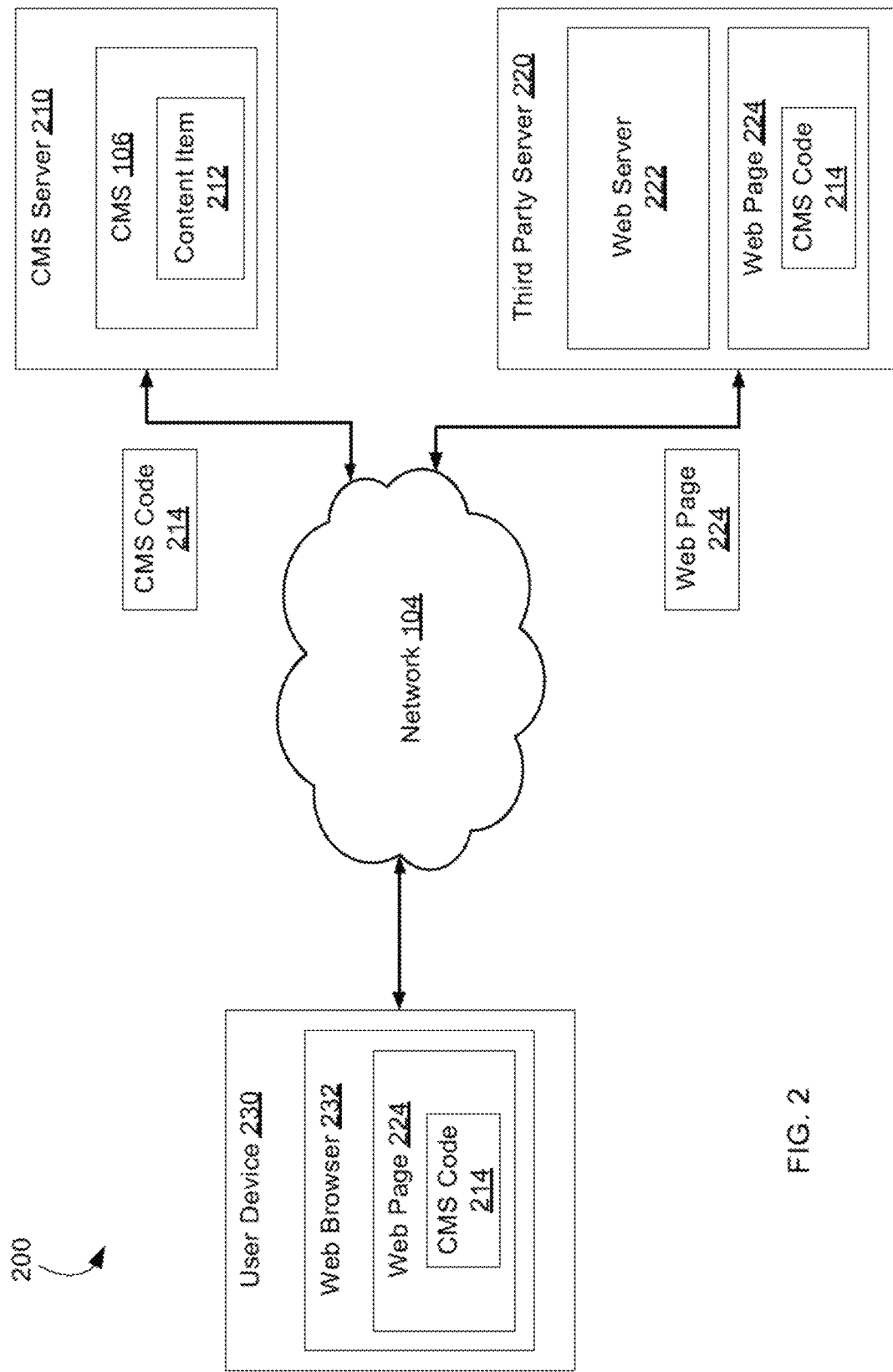
FIG. 2 is a block diagram of an example system for providing embedded folder web views for web pages.

FIG. 2 is a block diagram of an example system 200 for providing embedded folder views for web pages. System 200 can include content management system (CMS) server 210. For example, CMS server 210 can be a computing device that implements or executes (e.g., all or a portion of) content management system 106. As described above, content management system 106 can be configured to manage content items, such as content item 214. For example, content item 214 can be a content item folder (e.g., content item collection, content item grouping, shared folder, read-only shared folder, etc.) associated with a user account managed by content management system 106. Content item 214 can be an individual content item (e.g., image, document, file, etc.) associated with a user account managed by content management system 106. The description that follows will refer to a folder or shared folder on content management system 106 when describing various features and/or processes, however, the techniques described herein can be applied to any content item in content management system 106.

In some embodiments, system 200 can include third party server 220. For example, server 220 can be a computing device configured with web server 222. Web server 222 can be configured to serve web pages (e.g., web page 224) to web browsers on various end user devices. For example, web page 224 can be created by a third party content creator to present information to other Internet users. For example, web page 224 can be configured by a blogger-user to present blog posts, including text and images. Web page 224 can be configured by a teacher to present information about a class being taught by the teacher, including links to materials or documents for the class.

In some embodiments, a content creator can embed a web view of content item 212 into web page 224. For example, the content creator (e.g., teacher, blogger, etc.) can have a user account with content management system 106. The content creator can use content management system 106 to manage content item 212. For example, a teacher can add class materials (e.g., documents, files, recordings, etc.) to the teacher's user account with content management system 106. A blogger can add blog materials (e.g., images, documents, files, etc.) to the blogger's user account with content management system 106. Content management system 106 can store the class materials and/or blog materials as content items in folders associated with the blogger's and/or teacher's user accounts within content management system 106.

After the content creator adds the content items to a folder within the content creator's user account within content management system 106, the content creator can request from content management system 106 code (e.g., CMS code 214) for publishing or embedding a web view of the content items (e.g., a folder, a document, an image, etc.) into webpage 224. For example, CMS code 214 can be (e.g., HTML, javascript, etc.) code that can be embedded into webpage 224 to generate a web view of content items in content management system 106.

In some embodiments, system 200 can include user device 230. For example, user device 230 can be a computing device, such as a smartphone, tablet computer, wearable device (e.g., smartwatch, smart glasses, etc.), laptop computer, desktop computer, etc. User device 230 can include web browser 232. For example, a user of user device 230 can invoke web browser 232 and navigate to web server 222 through network 104 using web browser 232 to retrieve web page 224. When web browser 323 receives web page 224, web browser 232 can render web page 224 and display web page 224 on a display of user device 230. When web page 224 includes embedded CMS code 214, web browser 232 can execute the embedded CMS code 214 to retrieve from content management system 106 (e.g., from user interface module 122) information necessary for rendering an embedded web view of content items managed by content management server 106 on web page 224. Thus, although web page 224 is served by web server 222 on third party server 220, web page 224 presents a web view of content items managed by content management system 106 on CMS server 210.

FIG. 3 illustrates an example graphical user interface 300 presenting a web page having content linked using traditional mechanisms. For example, graphical user interface (GUI) 300 can correspond to a web page rendered by web browser 232 and displayed on user device 230. In this example, GUI 300 can present a web page configured by a web page author that has links 302 (e.g., hyperlinks) for accessing files or other content items. For example, GUI 300 can present a web page for a class taught by a teacher. The teacher may wish to make files, handouts, or other materials for the class available to students through the class web page and has, therefore, provided individual links to the class materials on the web page.

However, should the teacher wish to update the class web page with additional materials or remove existing materials, the teacher will have to edit the class web page (e.g., modify the web page code) to add additional links or remove existing links. Moreover, if the teacher wishes to provide additional information about the linked materials (e.g., descriptions, file sizes, file types, etc.), the teacher will have to edit the class web page to provide this information whenever materials are added to or deleted from the web page.

Figure 4:
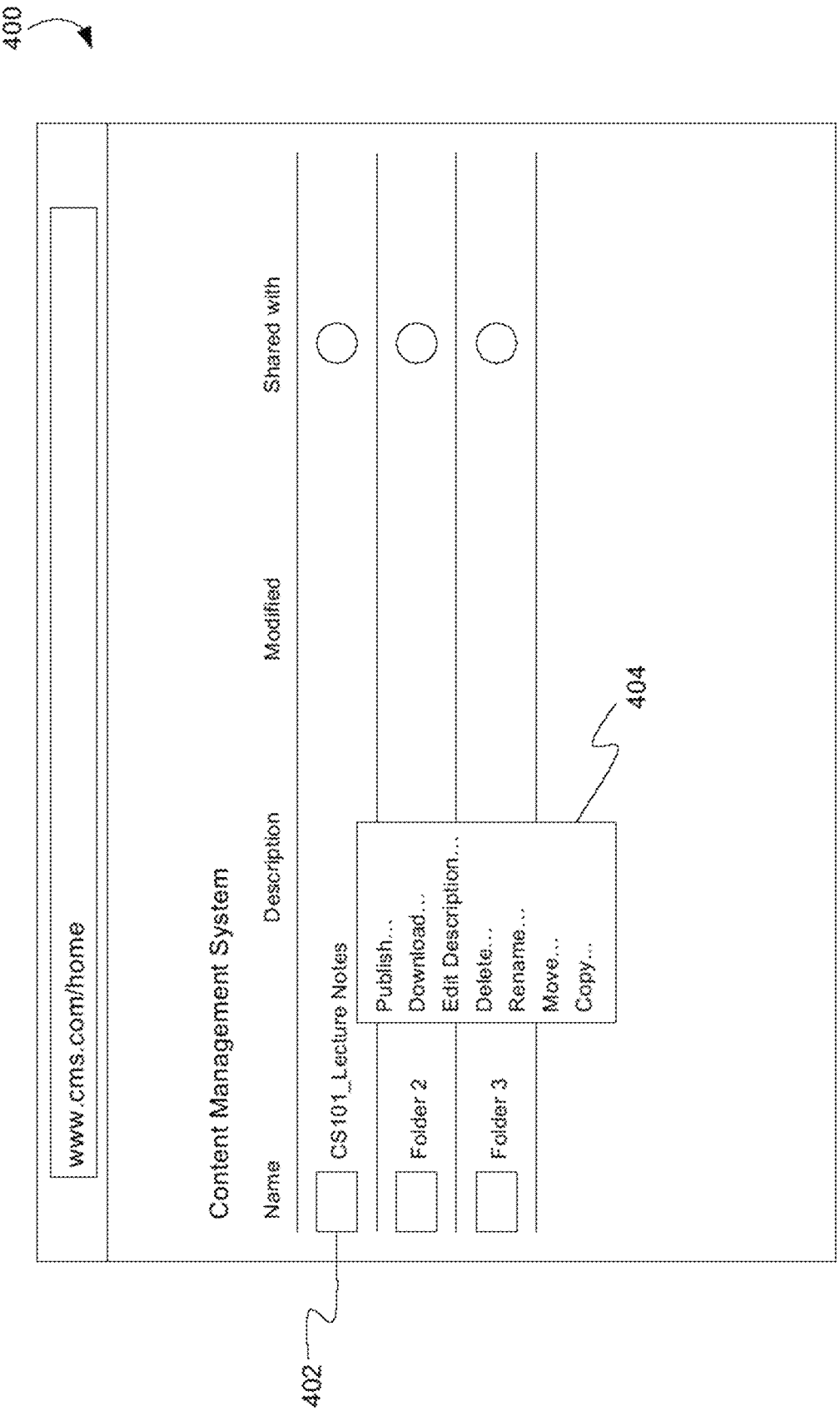
FIG. 4 illustrates an example graphical user interface presenting a web view of folders in a user account in a content management system.

FIG. 4 illustrates an example graphical user interface 400 presenting a web view of folders in a user account in content management system 106. For example, GUI 400 can be a web page presented by a web browser on a display of a user device that allows the user to view, navigate, manipulate, and/or modify folders and/or content items associated with the user's account in content management system 106. For example, GUI 400 can present content items (e.g., individual files, folders, etc.) associated with an account belonging to the teacher discussed above.

In some embodiments, GUI 400 can present a folder 402 managed by content management system 106. Continuing the example above, folder 402 can be a folder that the teacher uses to store lecture notes for the class the teacher is teaching. Upon receiving a user selection of folder 402, GUI 400 can present menu 404 that displays options for folder 402. For example, menu 404 can present a "publish" option that when selected by a user (e.g., the teacher) presents GUI 500 of FIG. 5 that allows the user to select options for sharing and/or publishing folder 402.

Figure 5:
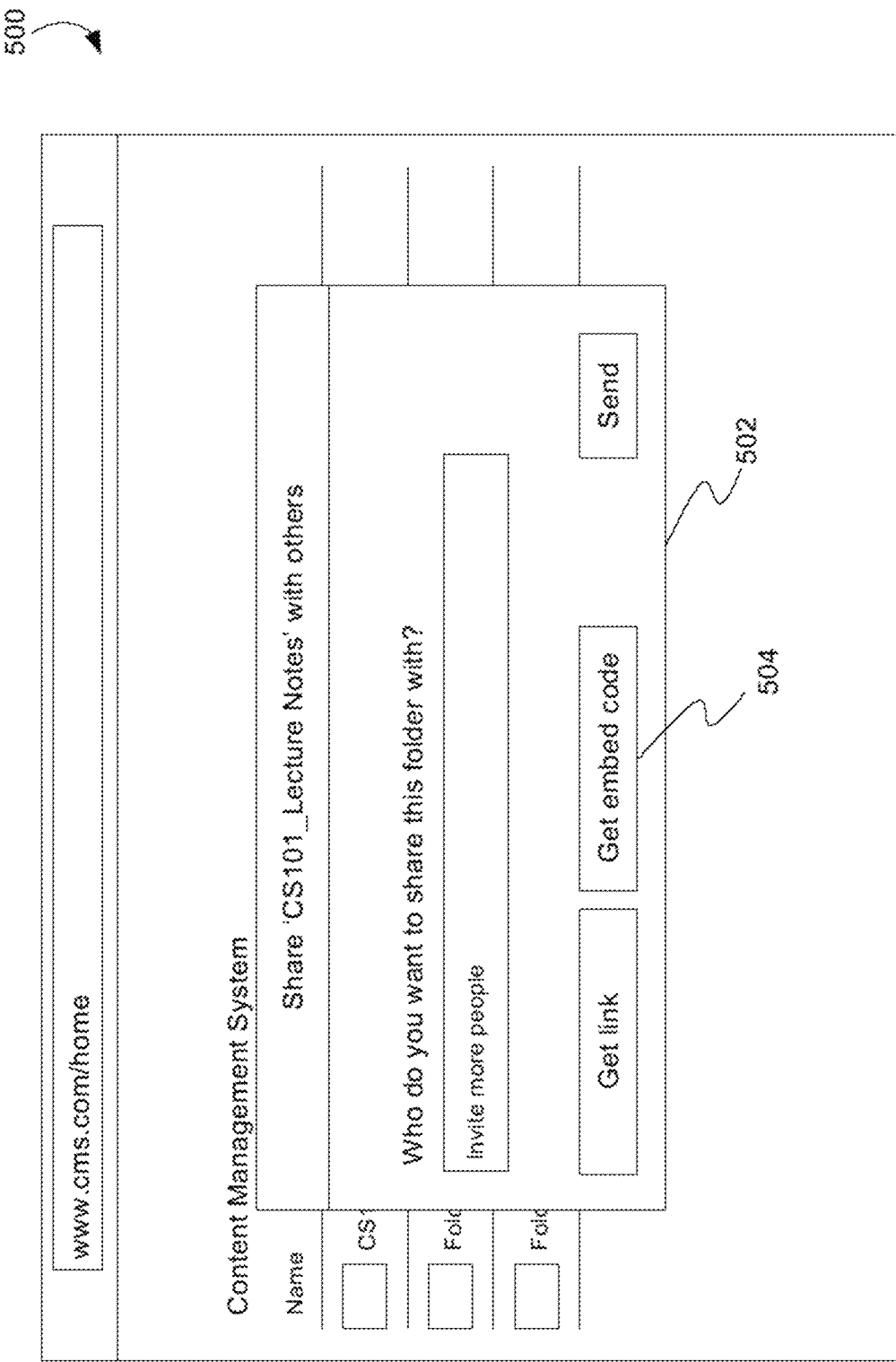
FIG. 5 illustrates an example graphical user interface for selecting an option for publishing a folder of the content management system.

FIG. 5 illustrates an example graphical user interface 500 for selecting an option for publishing a folder in content management system 106. For example, graphical element 502 of GUI 500 can be presented in response to a user (e.g., the teacher) selecting the "publish" folder option presented in menu 404 of FIG. 4. Graphical element 502 can be a window, dialog box, modal, popup, or other graphical element that presents options for publishing folder 402. In some embodiments, graphical element 502 can include graphical element 504. For example, graphical element 504 can be selected by a user to cause content management system to generate web page code (e.g., HTML, javascript, etc.) that can be embedded into a web page to publish or present a web view of the contents of folder 402. Upon receiving user input selecting graphical element 504, the web browser can present GUI 600 of FIG. 6, for example.

Figure 6:
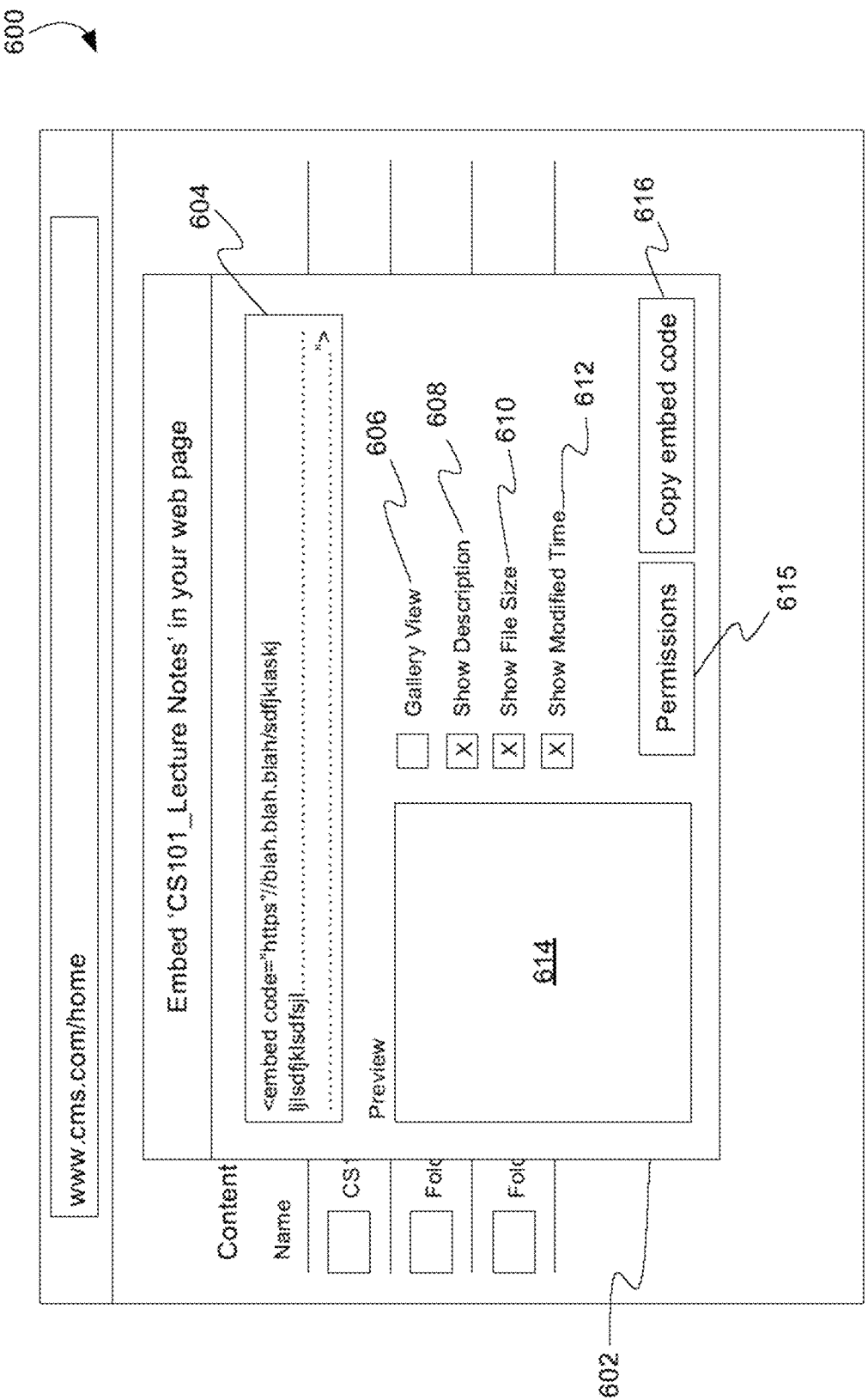
FIG. 6 illustrates an example graphical user interface for obtaining code for embedding a web view of a folder managed by the content management system into a web page.

FIG. 6 illustrates an example graphical user interface 600 for obtaining code for embedding a web view of a folder managed by content management system 106 into a web page. For example, GUI 600 can be a web page presented by a web browser that presents graphical element 602 for obtaining from content management system 106 code for publishing or embedding a web view of folder 402 into a web page. Graphical element 602 can be, for example, a window, dialog box, popup, overlay or other graphical element for presenting options for obtaining web page code for embedding the web view of folder 402 into a web page.

In some embodiments, graphical element 602 can include graphical element 604. For example, graphical element 604 can present text representing web page code ("embed code") that when embedded in a web page causes the web page to present a web view of the contents of folder 402. Graphical element 602 can include graphical element 614 for presenting a preview of how the contents of folder 402 will be presented when the code presented in graphical element 604 is embedded into a web page.

In some embodiments, graphical element 602 can include user selectable options for presenting the web view of graphical element 604. For example, each content item in folder 402 can have associated metadata. The metadata can include an identifier (e.g., name) for the content item, a description of the content item, an indication of the size of the content item, a timestamp indicating when the content item was last modified, and/or other descriptive information about the corresponding content item. Graphical element 602 can include selectable options that allow the user (e.g., the teacher, blogger, etc.) to select which metadata items are presented in the embedded web view of the folder generated by the web page code displayed in graphical element 604. If no options are selected, then the web view of folder 402 may present the identifier for each content item.

In some embodiments, a user can select one or more of options 608, 610, and/or 612 to have additional information for each content item presented in the web view for folder 402. For example, the teacher discussed above can select graphical element 608 to generate embed code that generates a web view of folder 402 that includes a description of each content item. The teacher can select graphical element 610 to generate embed code that presents a web view of folder 402 that includes the size of each content item in folder 402. The teacher can select graphical element 612 to generate embed code that presents a web view of folder 402 that includes the last modified time of each content item. In some embodiments, the teacher can select graphical element 606 to adjust how content items are organized in the folder web view. For example, the teacher can select graphical element 606 to generate embed code that generates a web view of folder 402 that organizes content items in a gallery view instead of the default details view (e.g., list view), as described further below.

In some embodiments, the web browser can dynamically update the embed code presented in graphical element 604 based on the embed code options (e.g., options 606, 608, 610, 612) selected by the user. For example, upon invocation of graphical element 602 (e.g., selection of graphical element 504), the web browser can send a request to content management system 106 to receive the embed code for embedding a web view of folder 402 into a web page. Upon receipt of the embed code, the web browser can present the embed code on graphical element 604. When a user selects one or more of the options 606, 608, 610, and/or 612, the web browser can send a request for updated embed code to content management system 106 that identifies the selected options. In response to receiving the request, content management system 106 can generate embed code according to the selected options so that the embed code will cause the embedded web view of folder 402 to display the user selected information. Content management system 106 can return the embed code generated based on the selected options to the web browser and the web browser can display the embed code on graphical element 604. Thus, the web browser can dynamically update the embed code displayed on graphical element 604 in response to a user selecting one or more of options 606, 608, 610, and/or 612.

In some embodiments, the web browser can dynamically update the preview presented in graphical element 614 based on the user-selected options. As described above, the web browser can request updated embed code from content management system 106 in response to receiving a user selection of one or more options 606, 608, 610 and/or 612. When the updated embed code is received, the web browser can generate an updated preview of how the web view of folder 402 will appear when embedded in a web page based on the updated embed code. Thus, the web browser can dynamically update the preview displayed on graphical element 614 in response to a user selecting one or more of options 606, 608, 610, and/or 612.

In some implementations, graphical element 602 can include graphical element 615 for specifying permissions for the web view of folder 402. For example, the web view of folder 402 can be considered a published version of folder 402. The teacher may wish to specify access permissions for the published version of folder 402. For example, the teacher may wish to grant the teacher's assistant read-write permissions to the published version of folder 402 while allowing students only read-write access to the contents of the published version of folder 402. To specify the permissions, the teacher can select graphical element 615 to cause GUI 600 to present a graphical element (not shown) for specifying the permissions for the published version of folder 402. The teacher can provide input to GUI 600 specifying that other general users should be granted read-only access to the published version of folder 402. The teacher can provide input to GUI 600 specifying that specific users (e.g., the teacher's assistant) should be granted read-write access to the published version of folder 402. The teacher can provide input to GUI 600 specifying that all users should be granted read-write access to the published version of folder 402. However, if the teacher does not specify permissions, the permissions for the published version of folder 402 can be set to read-write by default. Thus, when the published version of folder 402 (e.g., through the web view or through a local synchronized copy of the published folder) is accessed by another user, the user may be granted access according to the permissions specified for the published folder by the teacher (e.g., owner of folder 402).

In some embodiments, graphical element 602 can include graphical element 616 for obtaining a copy of the embed code presented on graphical element 604. For example, after the teacher selects the web view folder display options and is satisfied with the look of the web view as illustrated by the preview presented in graphical element 614, the teacher can select graphical element 616 to obtain a copy of the embed code presented on graphical element 604. For example, upon receipt of a user selection of graphical element 616, the web browser can copy the embed code to memory (e.g., a clipboard) of the teacher's computing device. The teacher can then paste the embed code into the web page code for the teacher's web page. For example, the teacher discussed above can paste the embed code into the web page (e.g., GUI 300) for the class that the teacher is teaching to cause the web page to present a web view of folder 402, as illustrated by FIG. 7. Thus, anybody who has access to the teacher's web page can obtain a read-only view of the teacher's published folder (e.g., folder 402) on content management system 106.

FIG. 7 illustrates an example graphical user interface 700 that includes an embedded web view of a folder managed by content management system 106. For example, GUI 700 can be a web page (e.g., web page 224) created by a third party (e.g., the teacher described above) that includes embed code generated by content management system 106 for presenting or publishing a web view of folder 402. The embed code can include instructions that cause web browser 232 to retrieve a web page (e.g., HTML code, javascript, etc.) or portion of a web page from content management system 106 that displays a dynamic interactive view or representation of folder 402. Web browser 232 can present the web page, including the web view of folder 402 on a display of user device 230. Thus, the user can view the contents of a first website (e.g., content management system 106) through a webpage provided by a second website (e.g., third party web server 222).

In some embodiments, GUI 700 can include folder web view 702. For example, folder web view 702 can present a manipulable representation of each content item in folder 402. Thus, continuing the teacher example above, students of the teacher who have access to the teacher's web page (e.g. web page 300, web page 700) can view and navigate through items in folder 402. However, since the folder web view 702 is read-only to the students, the student may not be able to modify the content items and/or content item metadata represented in folder web view 702.

In some embodiments, web browser 232 can dynamically adjust the appearance of folder web view 702 based on the hosting web page. For example, the third party web page may have a color scheme (e.g., background color, text color, etc.) that may not match the default color scheme (e.g., white background, black text, etc.) of folder web view 702. Folder web view 702 may stand out on the third party web page and look out of place if the colors clash or are too different. Therefore, in some embodiments, the embed code described above (or the HTML, javascript, etc., retrieved as a result of execution of the embed code) can include instructions for determining the color scheme used by the third party web page and adjusting the color scheme of folder web view 702 to match the color scheme of the third party web page. Thus, when web browser 232 renders the third party web page containing the embed code, the folder web view 702 will blend in with the content of the third party web page.

In the example of FIG. 7, folder 402 has three content items represented in folder web view 702 as content items 704, 706, and 708. Folder web view 702 can present an identifier (e.g., name) for each content item. Folder web view 702 can present additional information (e.g., description, size, last modified date, etc.) according to the options selected on GUI 700, described above. For example, if no options were selected by the user, then folder web view 702 may only display the name of the content items 704, 706, and 708 and/or graphical elements or images (e.g., icons) representing each content item. If the user selected options for displaying the description, size and/or modified date, then folder web view 702 will display the information corresponding to the selected options.

In some embodiments, folder web view 702 can be dynamically updated to reflect changes to folder 402 managed by content management system 106. For example, if a content item is added or removed from folder 402, folder web view 702 can be dynamically and automatically updated to present an added content item or hide a removed content item. If a content item in folder 402 is modified, folder web view 702 can be automatically and dynamically updated to show when the corresponding content item was last modified. If the metadata for a content item folder 402 is modified, folder web view 702 can be automatically and dynamically updated to present the modified metadata. For example, if a user adds a description to a content item in folder 402 through content management system 106, then the description of the content item can be presented in folder web view 702.

In some embodiments, folder web view 702 can allow the user to invoke other features of content management system 106. For example, if the user is a registered user of (e.g., has an account with) content management system 106, folder web view 702 can present graphical element 712 that presents options for adding folder 402 represented by folder web view 702 to the user's account on content management system 106. For example, while the user is logged into the user's account on content management system 106, the user can select graphical element 710 (e.g., button, icon, ellipses, etc.) to cause folder web view 702 to present graphical element 712.

Graphical element 712 can be, for example, an options menu that provides an option (e.g., "Join published folder") to add a published version of folder 402 to the user's account. In response to receiving a user selection of the "Join published folder" option, web browser 232 can send a request to content management system 106 to add folder 402 (e.g., a copy of folder 402, a reference to folder 402, etc.) to the users account as a read-only folder (e.g., a published folder). In this case, the published folder in the user's account can be dynamically updated (e.g., synchronized) whenever content items are added, removed, modified, or otherwise manipulated by users (e.g., the teacher) having read-write access to folder 402. Thus, whenever the owner (e.g., creator, the teacher, the blogger, etc.) adds a new content item to folder 402, the new content items can be synchronized (e.g., added to) the corresponding published folder in the user's content management system account.

In some embodiments, graphical element 712 can include an option to download a compressed copy of folder 402. For example, in response to receiving a selection of the "Download as zip" option, content management system 106 can compress the contents of folder 402 into a single content item (e.g., zip file, compressed file, etc.). Content management system 106 can send the compressed content item to the user's device where the user can decompress the content item and view or manipulate the local copies of content items from folder 402. The compressed content item can be stored, manipulated, etc., externally to content management system 106 and does not require that the receiving user has an account with content management system 106.

In some embodiments, graphical element 712 can include an option to save folder 402 to the requesting user's account. For example, when the user selects the "Save to my account" option, content management system 106 will save a copy of folder 402 to the requesting user's account. In this case, the copy of folder 402 saved to the user's account is a distinct read-write copy of folder 402 that does not get synchronized with folder 402. Thus, any updates made to folder 402 will not get propagated to the copy of folder 402 created when the user selects the "Save to my account" option.

Figure 8:
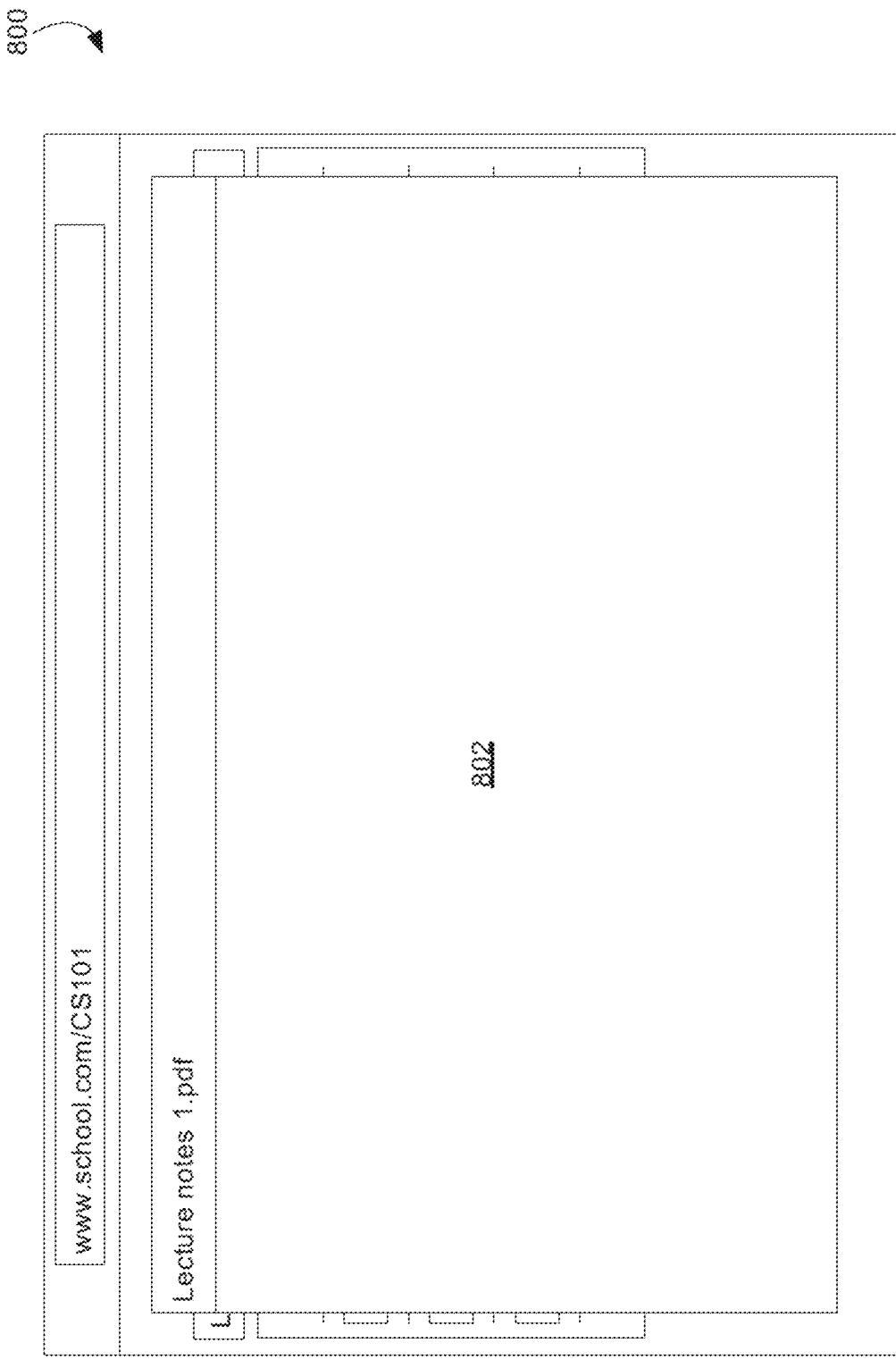
FIG. 8 illustrates an example graphical user interface for presenting a content item selected from the folder web view.

FIG. 8 illustrates an example graphical user interface 800 for presenting a content item selected from folder web view 702. For example, upon receiving a selection of content item 704 in folder web view 702, web browser 232 can present a representation 802 of the content in content item 704. In some embodiments, the user can provide input to navigate (e.g., scroll) through the content of content item 704 but the user may not be able to edit content item 704. Thus, content item 704 may be provided to the user as a read-only item.

FIG. 9 illustrates an example graphical user interface 900 for navigating subfolders in folder web view 702. For example, GUI 900 can correspond to GUI 700 of FIG. 7, but, GUI 900 includes subfolder 902. For example, subfolder 902 can represent a folder that has been added to folder 402. Web browser 232 can automatically and dynamically update folder web view 702 to present subfolder 902 when the new folder has been added to folder 402 in content management system 106. For example, content management system 106 can send folder update information (e.g., updated web page code) to web browser 232 to cause web browser 232 to update folder web view 702 when the new folder is added to folder 402.

In some embodiments, a user can select subfolder 902 in folder web view 702 to view the contents of subfolder 902. For example, upon receiving a selection of subfolder 902, web browser 232 can send a request to content management system 106 to obtain a web view (e.g., web page code) representing the contents of subfolder 902. Thus, the user can navigate the contents of a first website (e.g., content management system 106) through a webpage provided by a second website (e.g., third party web server 222).

FIG. 10 illustrates an example graphical user interface 1000 for presenting a web view of a subfolder. For example, web browser 232 can present GUI 1000 in response to receiving a selection of subfolder 902 of GUI 900. In some embodiments, GUI 1000 can include folder web view 1002 representing the contents of subfolder 902. For example, folder web view 1002 can have functionality the same as or similar to folder web view 702, described above.

Figure 11:
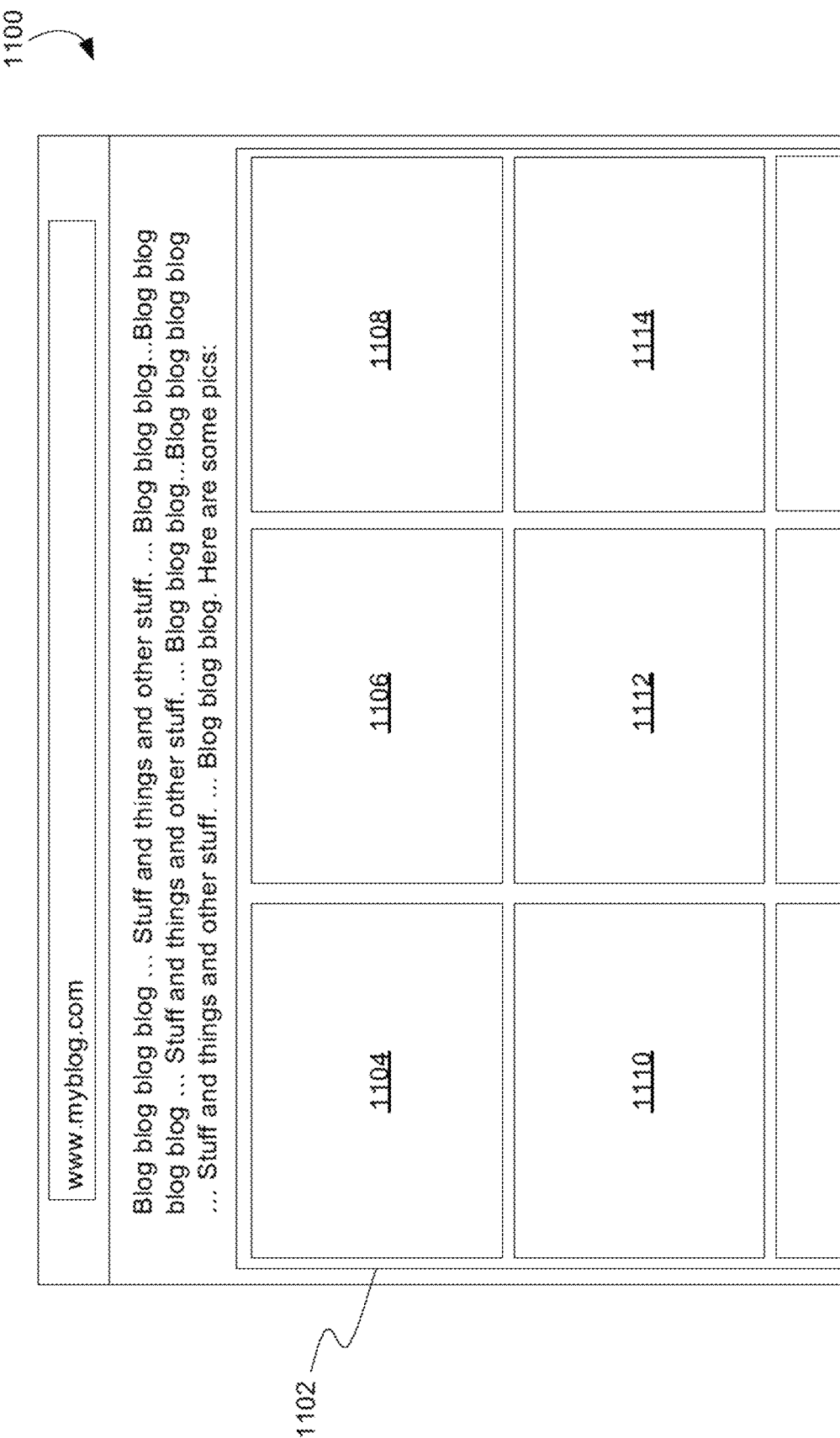
FIG. 11 illustrates an example graphical user interface for presenting a gallery web view of folder.

FIG. 11 illustrates an example graphical user interface 1100 for presenting a gallery web view of folder 402. As described above with reference to FIG. 6, a user can select various options for displaying content of a published folder (e.g., folder 402) in an embedded folder web view on a web page. One of those options can be a gallery view option 606. When GUI 600 receives a selection of gallery view option 606, GUI 600 can request embed code from content management system 106 that will present contents of folder 402 in a gallery view representation. When a web page creator (e.g., the teacher, the web blogger, etc.) adds the embed code to the web page, the web browser (e.g., web browser 232) can present a gallery view of the contents of folder 402 in folder web view 1102. For example, when presenting a gallery view arrangement of content items (e.g., images), web browser 232 can present the content items in a non-overlapping tiled format, as illustrated by FIG. 11. For example, when the content items in shared folder 402 are images, the images 1104-1114 (e.g., the contents of the content items) can be presented in a non-overlapping tiled format as illustrated by FIG. 11.

Figure 12:
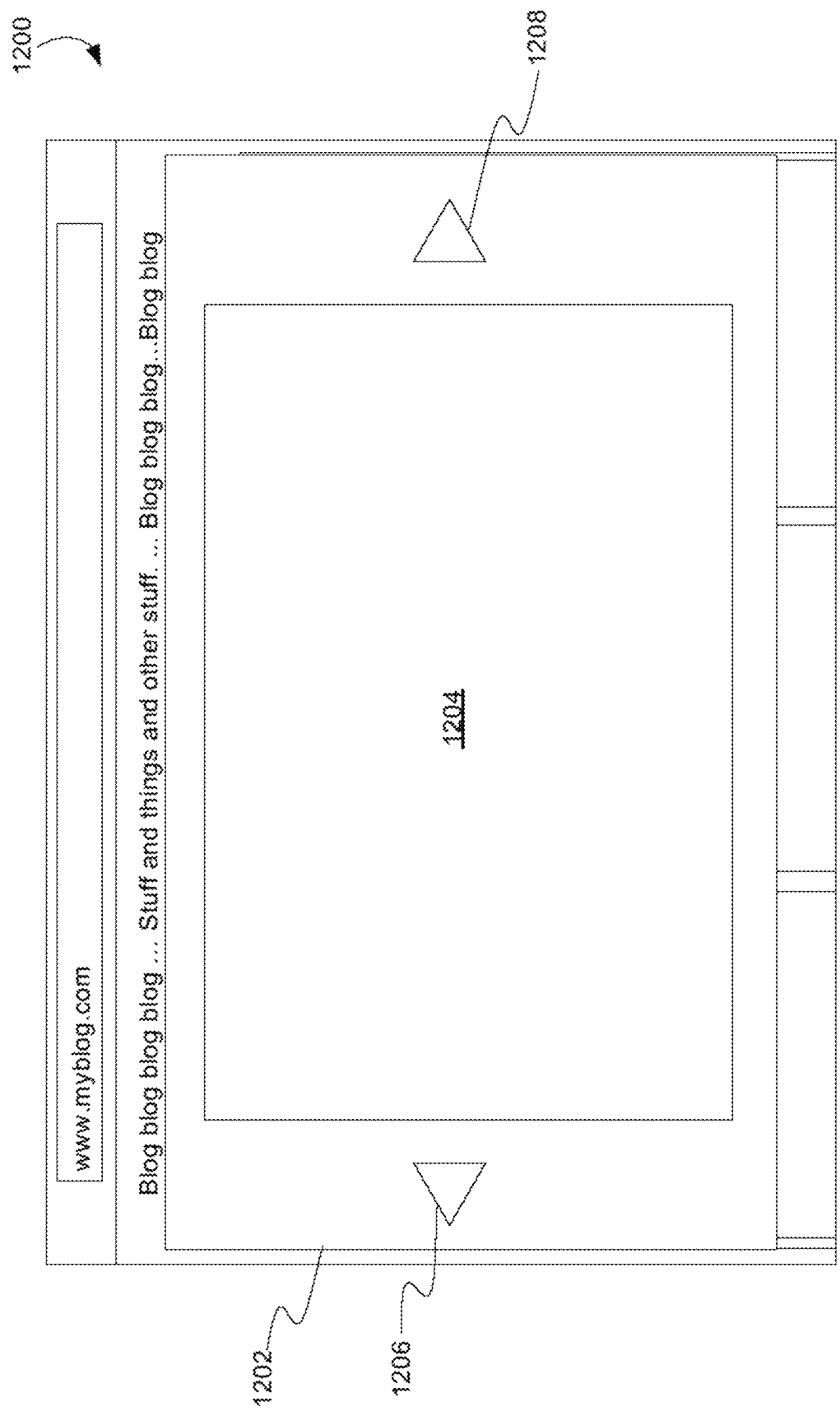
FIG. 12 illustrates an example graphical user interface for presenting a content item selected from a gallery view representation of content items in a folder web view.

FIG. 12 illustrates an example graphical user interface 1200 for presenting a content item selected from a gallery view representation of content items in folder web view. For example, a user of web browser 232 can select one of the images 1104-1114 in FIG. 11 to view an enlarged version of the selected image. For example, upon receiving the selection of image 1104, web browser 232 can present enlarged image 1204 in image area 1202. Image area 1202 can be, for example, an overlay presented on top of folder web view 1102 of FIG. 11. In some embodiments, a user can provide input to graphical elements 1206 or 1208 to cause web browser 232 to navigate or transition between images 1104-1114 presented in the gallery web view of folder 402.

Figure 13:
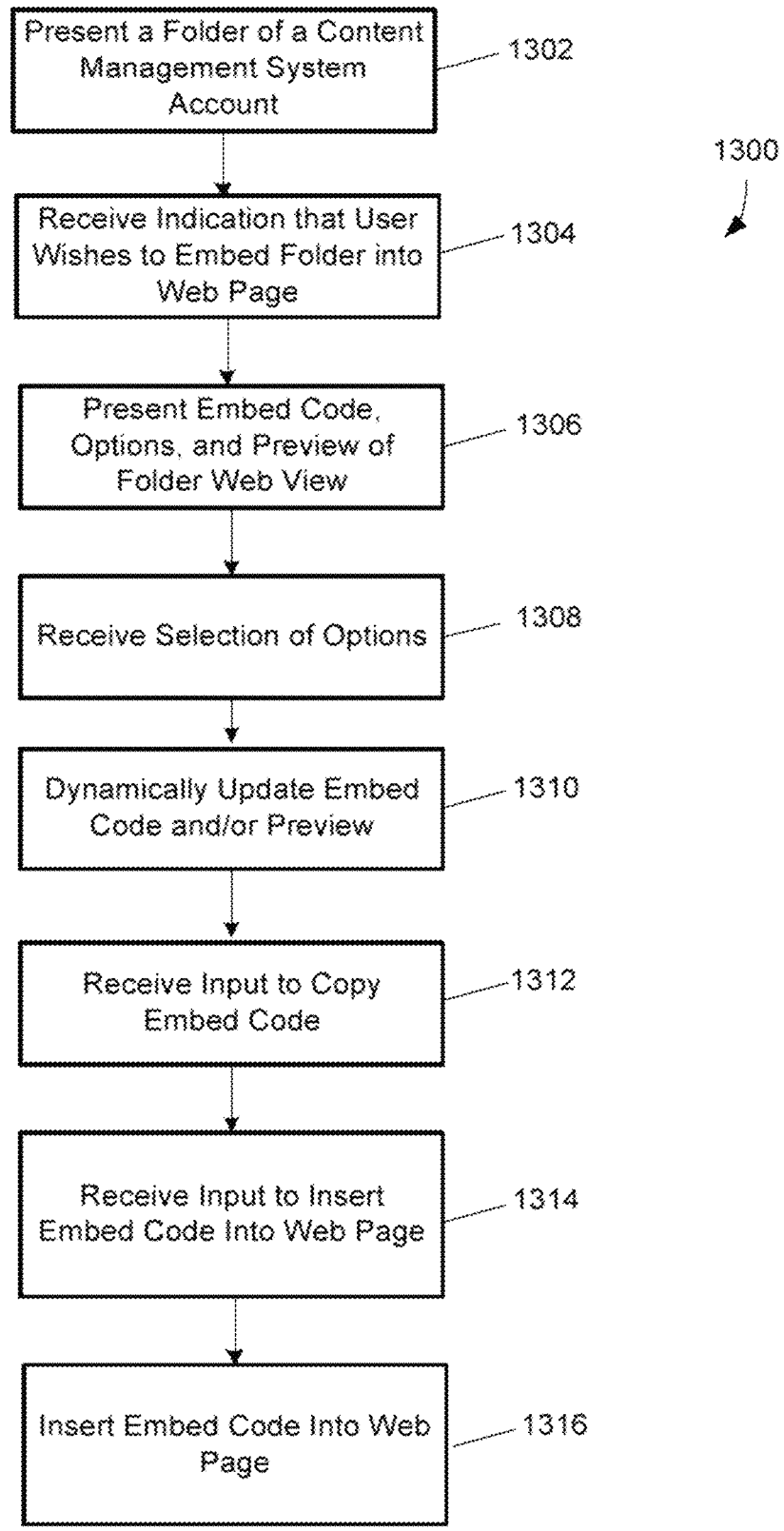
FIG. 13 is a flow diagram of an example process for obtaining embed code for embedding a web view of a shared folder of a content management system into a web page.

FIG. 13 is a flow diagram of an example process 1300 for obtaining embed code for embedding a web view of a shared folder of a content management system into a web page. For example, process 1300 can be performed by a computing device (e.g., user device 102$_i$, user device 230, etc.) executing a web browser (e.g., web browser 232) in communication with content management system 106.

At step 1302, the computing device can present a folder associated with a user account of a content management system. For example, a user can invoke the web browser and navigate to a web page for viewing folders within the user's account on content management system 106.

At step 1304, the computing device can receive an indication that the user wishes to publish a folder on a web page. For example, the web browser can receive user input selecting a folder within the user's account on content management system 106. The user input can indicate that the user would like to obtain embed code for embedding the selected folder into a web page. In response to the user input, the web browser can send a request to content management system 106 to obtain the embed code. When content management system 106 receives the request, content management system 106 can generate the embed code and send the embed code to the web browser.

In some embodiments, the user can specify permissions for the published folder. For example, when the user provides input to publish shared folder 402, the user can specify permissions for the published folder. The user can specify that the published folder is a read-only folder such that other users can only view the contents items in the published folder. The user can specify that the published folder is a read-write folder such that other users can read and modify the content items in the published folder. The user can specify different permissions for different users accessing the published folder. For example, the user can specify that a teacher's assistant has read-write access to the published folder while a student has read-only access to the shared folder.

At step 1306, the computing device can present embed code, embed code options and/or a preview of the folder web view generated by the web code. For example, the web browser can present GUI 600 that includes the received embed code, options for displaying content in the selected folder, and a preview of the received embed code, as described above.

At step 1308, the computing device can receive a selection of options for displaying content in the selected folder. For example, the user can select a gallery view option, a show description option, a show file size option, and/or a show modified time option, as described with reference to FIG. 6.

At step 1310, the computing device can dynamically update the embed code and/or preview based on the selected options. For example, in response to receiving input selecting an option, the web browser can send a request to content management system 106 requesting embed code corresponding to the selected options. Content management system 106 can generate the embed code for the selected options and send the updated embed code to the web browser. The web browser can then present the updated embed code on a display of the computing device, as illustrated by FIG. 6. In some embodiments, the web browser can generate an updated preview of the folder web view based on the updated embed code that illustrates how the selected options will be presented on a web page.

At step 1312, the computing device can receive input to copy the embed code. For example, the web browser can receive user input to copy the embed code to a clip board or a memory location within the computing device.

At step 1312, the computing device can receive input to insert the embed code into a web page. For example, the computing device can receive input to paste the embed code stored in memory into a web page being edited by the user.

At step 1314, the computing device can insert the embed code into the web page. For example, in response to receiving the input to paste the embed code into the web page, the computing device can insert the embed code into a web page being edited by the user.

Figure 14:
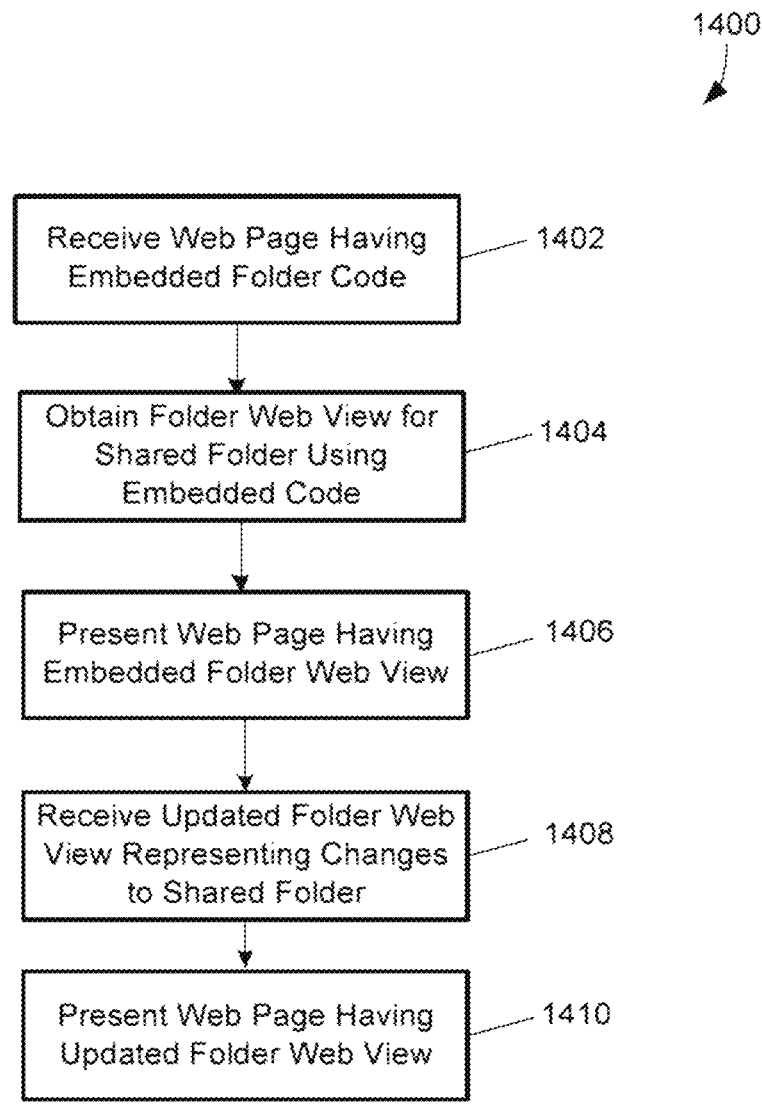
FIG. 14 is a flow diagram of an example process for presenting an embedded web view of a shared folder of a content management system on a web page.

FIG. 14 is a flow diagram of an example process 1400 for presenting an embedded web view of a folder of a content management system on a web page. For example, process 1400 can be performed by a computing device (e.g., user device 102$_i$, user device 230, etc.) executing a web browser (e.g., web browser 232) in communication with content management system 106.

At step 1402, the computing device can receive a web page having embedded folder code. For example, the user can, through web browser 232, request web page 224 created by a third party (e.g., a teacher, blogger, etc.) from a third party web server 222 that includes embedded code for providing a web view of a folder managed by content management system 106.

At step 1404, the computing device can obtain a folder web view for viewing content items within a folder of content management system 106 using the embedded code. For example, web browser 232 can execute the embedded code (e.g., HTML, JavaScript, a URL, etc.) to request a web view of folder 402 from content management system 106. The folder web view can be, for example, a web page or portion of a web page generated or served by content management system 106 that can be embedded in the third party web page 224.

At step 1406, the computing device can present the third party web page having the embedded folder web view. For example, web browser 232 can render the third party web page including the embedded folder web view of folder 402 and present the web page and folder web view on a display of the computing device.

At step 1408, the computing device can receive an updated folder web view representing changes to the folder. For example, the owner of the folder 402 on content management system 106 may modify the contents of folder 402 by adding, removing, or editing a content item and/or metadata corresponding to a content item in folder 402. Content management system 106 can detect the change to folder 402. In response to detecting the change to folder 402, content management system 106 can send an updated web view (e.g., HTML, javascript, etc.) of folder 402 to web browser 232.

At step 1410, the computing device can present the web page having the updated folder web view. For example, upon receipt of the updated web view of folder 402, web browser 232 can present the updated web view of folder 402 representing the changes made to folder 402 on a display of the computing device.

Figure 15:
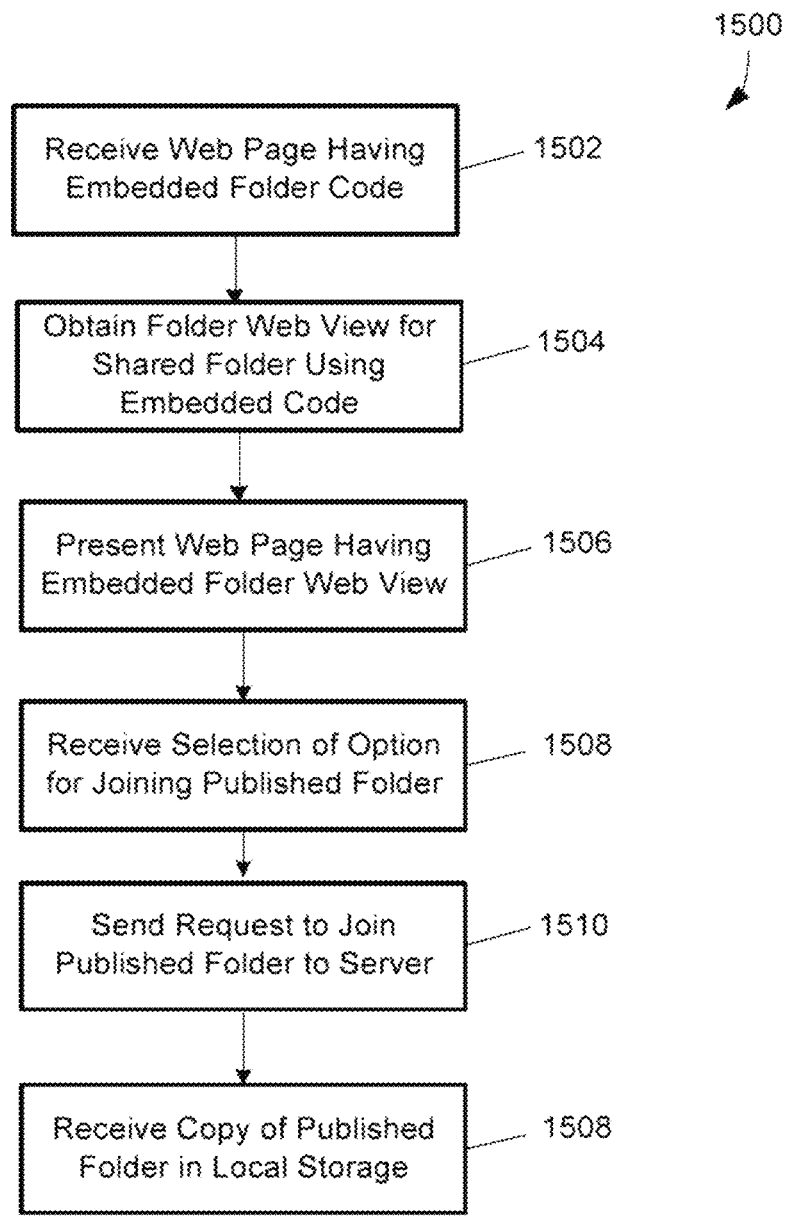
FIG. 15 is a flow diagram of an example process for joining a shared folder through an embedded web view of the shared folder of a content management system on a web page.

FIG. 15 is a flow diagram of an example process 1500 for joining a published folder through an embedded web view of the folder of a content management system on a web page. For example, process 1500 can be performed by a computing device (e.g., user device 102$_i$, user device 230, etc.) executing a web browser (e.g., web browser 232) in communication with content management system 106.

At step 1502, the computing device can receive a web page having embedded folder code. For example, the user can, through web browser 232, request web page 224 created by a third party (e.g., a teacher, blogger, etc.) from a third party web server 222 that includes embedded code for providing a web view of a folder managed by content management system 106.

At step 1504, the computing device can obtain a folder web view for viewing content items within a shared folder of content management system 106 using the embedded code. For example, web browser 232 can execute the embedded code (e.g., HTML, JavaScript, a URL, etc.) to request a web view of folder 402 from content management system 106. The folder web view can be, for example, a web page or portion of a web page generated and/or served by content management system 106 that can be embedded in the third party web page 224.

At step 1506, the computing device can present the third party web page having the embedded folder web view. For example, web browser 232 can render the third party web page including the embedded folder web view of folder 402 and present the web page and folder web view on a display of the computing device.

In some embodiments, the embedded folder web view can include options for registered users (e.g., account holders) of content management system 106. For example, if the user of the computing device is logged into content management system 106, the embedded folder web view of folder 402 of content management system 106 can present an option that allow account holders of content management system 106 to add a published version of folder 402 represented by folder web view 702 to the user's account on content management system 106.

At step 1508, the computing device can receive a selection of an option for joining the published folder represented by the embedded folder web view. For example, web browser 232 can receive user input to add a published version of folder 402 to the users account on content management system 106, as described above with reference to FIG. 7.

At step 1510, the computing device can send a request to content management system 106 to add a published version of folder 402 to the user's account on content management system 106 to shared folder 402. For example, web browser 232 can send a request to content management system 106 to publish folder 402 to the requesting user's account on content management system 106. Upon receiving the request, content management system 106 can make a read-only version of folder 402 available to the user's account on content management system 106, as described above with reference to FIG. 7. For example, content management system 106 can put a published version of folder 402 in the user's account that is read-only and also is synchronized with shared folder 402 according to the mechanisms described above with reference to FIG. 1. Alternatively, the published folder can have per-user permissions that allow some users read-write access (e.g., the teacher's assistant) while allowing other users read-only access (e.g., the students), as described above.

At step 1508, the computing device can receive a copy of the published folder in local storage of the computing device. For example, making shared folder 402 available to the requesting user's account on content management system 106 can include copying the published version of folder 402 to the user's account or adding a reference to folder 402 in the user's account. Upon making the published folder available to the requesting user's account on content management system 106, content management system 106 can synchronize the published folder in the user's account with the user's computing device. For example, synchronization of the published folder with the computing device can cause a read-only synchronized version of folder 402 to be stored in memory (e.g., hard drive, persistent storage, etc.) on the computing device. Thus, the user can access the published folder, and content items therein, even when the computing device is not connected to a network (e.g., network 104).

Figure 16A:
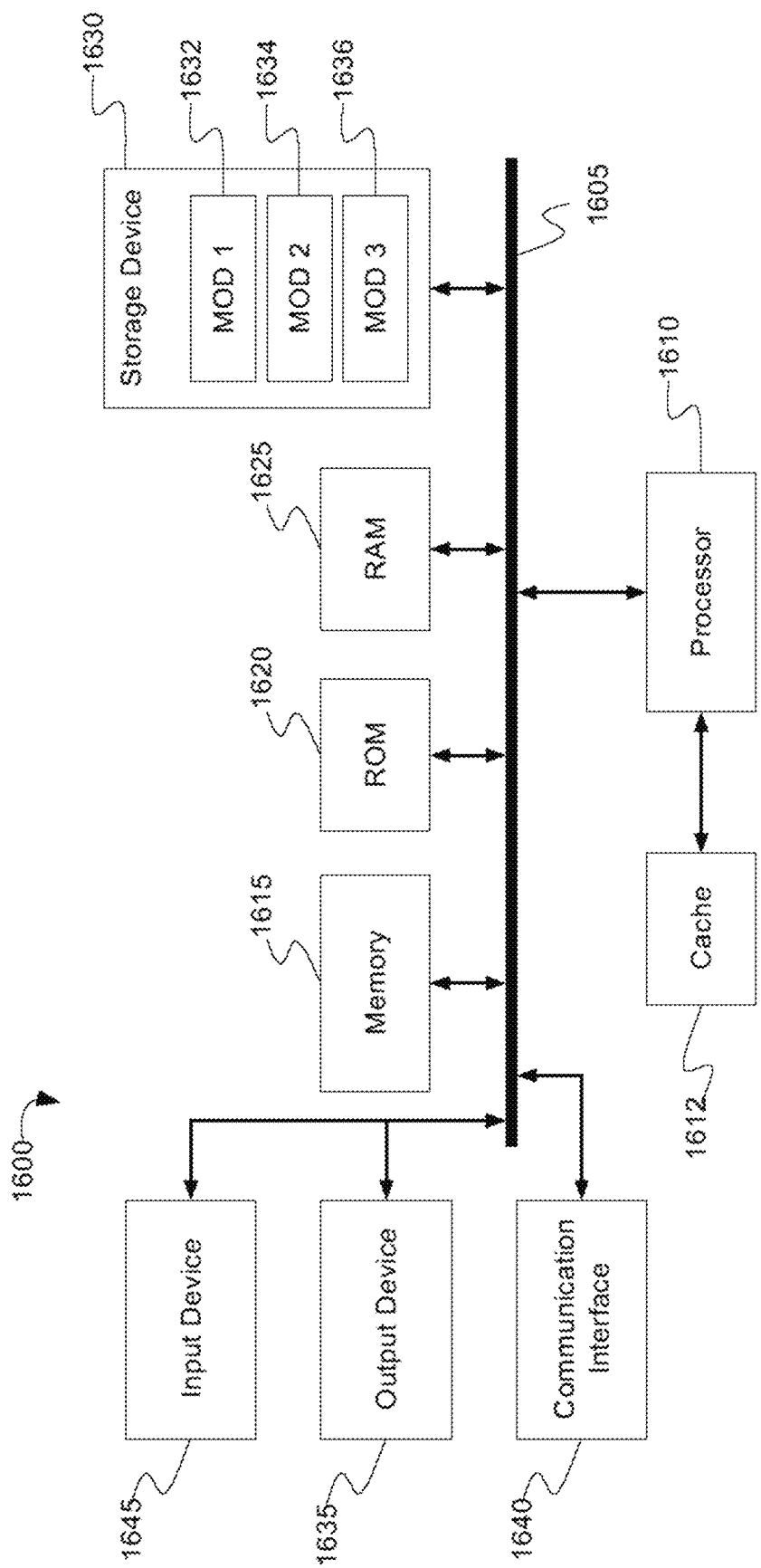
FIG. 16A shows an example possible system embodiment for implementing various embodiments of the present technology.
Figure 16B:
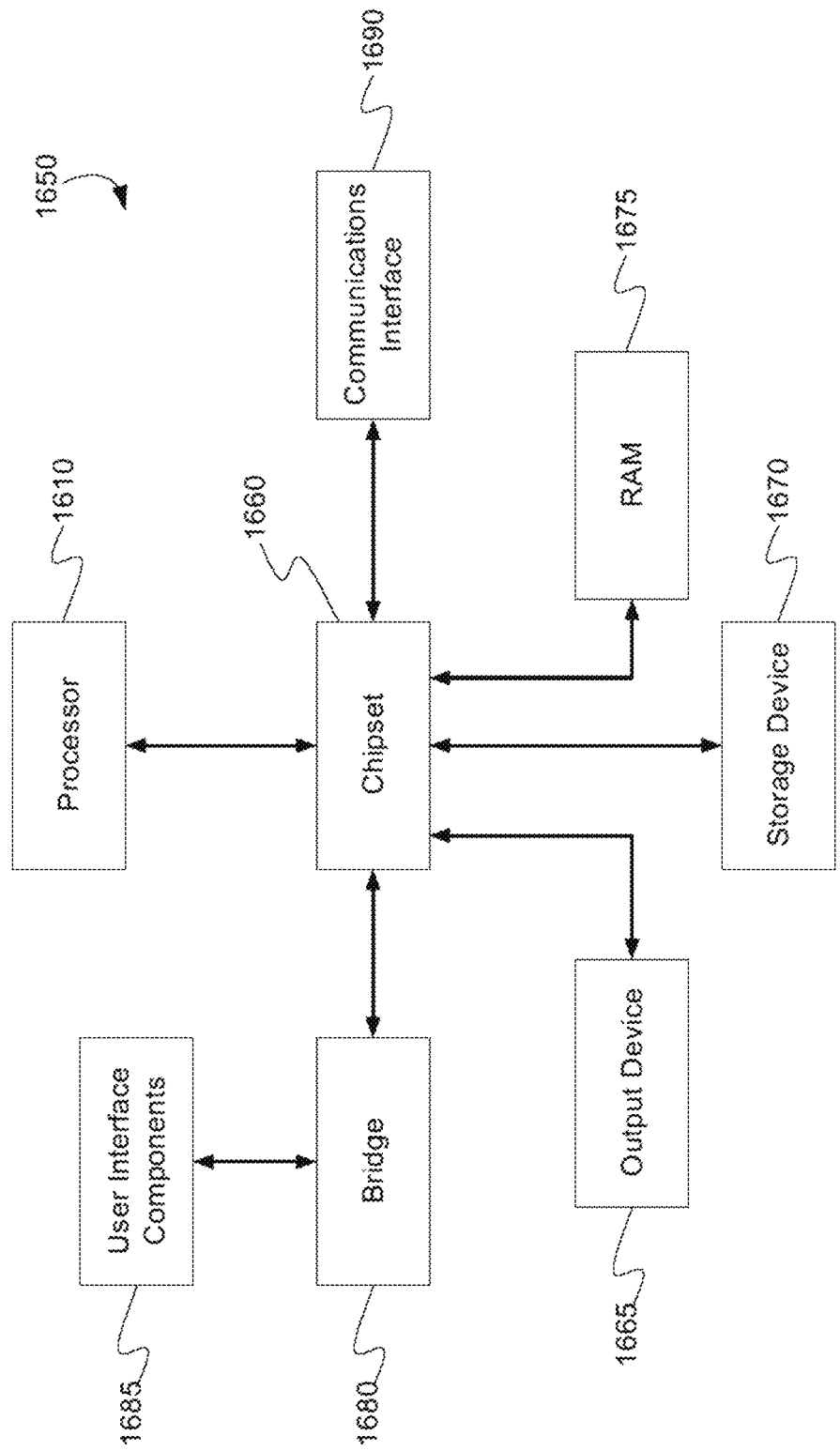
FIG. 16B shows an example possible system embodiment for implementing various embodiments of the present technology.

FIGS. 16A and 16B show example possible system embodiments. The more appropriate embodiment will be apparent to those of ordinary skill in the art when practicing the present technology. Persons of ordinary skill in the art will also readily appreciate that other system embodiments are possible.

FIG. 16A illustrates a conventional system bus computing system architecture 1600 wherein the components of the system are in electrical communication with each other using a bus 1605. Example system 1600 includes a processing unit (CPU or processor) 1610 and a system bus 1605 that couples various system components including the system memory 1615, such as read only memory (ROM) 1620 and random access memory (RAM) 1625, to the processor 1610. The system 1600 can include a cache of high-speed memory connected directly with, in close proximity to, or integrated as part of the processor 1610. The system 1600 can copy data from the memory 1615 and/or the storage device 1630 to the cache 1612 for quick access by the processor 1610. In this way, the cache can provide a performance boost that avoids processor 1610 delays while waiting for data. These and other modules can control or be configured to control the processor 1610 to perform various actions. Other system memory 1615 may be available for use as well. The memory 1615 can include multiple different types of memory with different performance characteristics. The processor 1610 can include any general purpose processor and a hardware module or software module, such as module 1 1632, module 2 1634, and module 3 1636 stored in storage device 1630, configured to control the processor 1610 as well as a special-purpose processor where software instructions are incorporated into the actual processor design. The processor 1610 may essentially be a completely self-contained computing system, containing multiple cores or processors, a bus, memory controller, cache, etc. A multi-core processor may be symmetric or asymmetric.

To enable user interaction with the computing device 1600, an input device 1645 can represent any number of input mechanisms, such as a microphone for speech, a touch-sensitive screen for gesture or graphical input, keyboard, mouse, motion input, speech and so forth. An output device 1635 can also be one or more of a number of output mechanisms known to those of skill in the art. In some instances, multimodal systems can enable a user to provide multiple types of input to communicate with the computing device 1600. The communications interface 1640 can generally govern and manage the user input and system output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof.

The storage device 1630 can include software modules 1632, 1634, 1636 for controlling the processor 1610. Other hardware or software modules are contemplated. The storage device 1630 can be connected to the system bus 1605. In one aspect, a hardware module that performs a particular function can include the software component stored in a computer-readable medium in connection with the necessary hardware components, such as the processor 1610, bus 1605, display 1635, and so forth, to carry out the function.

FIG. 16B illustrates a computer system 1650 having a chipset architecture that can be used in executing the described method and generating and displaying a graphical user interface (GUI). Computer system 1650 is an example of computer hardware, software, and firmware that can be used to implement the disclosed technology. System 1650 can include a processor 1655, representative of any number of physically and/or logically distinct resources capable of executing software, firmware, and hardware configured to perform identified computations. Processor 1655 can communicate with a chipset 1660 that can control input to and output from processor 1655. In this example, chipset 1660 outputs information to output 1665, such as a display, and can read and write information to storage device 1670, which can include magnetic media, and solid state media, for example. Chipset 1660 can also read data from and write data to RAM 1675. A bridge 1680 for interfacing with a variety of user interface components 1685 can be provided for interfacing with chipset 1660. Such user interface components 1685 can include a keyboard, a microphone, touch detection and processing circuitry, a pointing device, such as a mouse, and so on. In general, inputs to system 1650 can come from any of a variety of sources, machine generated and/or human generated.

Chipset 1660 can also interface with one or more communication interfaces 1690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1655 analyzing data stored in storage 1670 or 1675. Further, the machine can receive inputs from a user through user interface components 1685 and execute appropriate functions, such as browsing functions by interpreting these inputs using processor 1655.

It can be appreciated that example systems 1600 and 1650 can have more than one processor 1610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, at a computing device via a web browser, a web page from a third party server having embed code for presenting an embedded folder view of a first folder on the web page from the third party server, the first folder corresponding to a first account of a content management system corresponding to a first user, where the third party server is distinct from the content management system;

executing, by the computing device, the embed code to request the embedded folder view of the first folder from the content management system;

determining, by the computing device, that a second user of the computing device has a second account with the content management system based on login information associated with the second account;

rendering, by the computing device, the web page including the embedded folder view of the first folder, where the embedded folder view presents representations of content items in the first folder in the content management system on the web page hosted by the third party server and wherein the embedded folder view includes a graphical element for adding a content item to the second account of the second user;

presenting, by the computing device, the web page hosted by the third party server, the web page comprising the embedded folder view of the first folder;

receiving, by the computing device, state update information for the embedded folder view from the content management system responsive to an owner of the first account modifying content contained in the first folder, the state update information describing a modified state of the first folder as a result of the owner modifying content contained therein;

updating, by the computing device, the embedded folder view on the web page by synchronizing the embedded folder view with the modified state of the first folder in the content management system;

receiving, by the computing device, a request from the second user to join a published version of the first; and responsive to receiving the request, causing, by the computing device, the content management system to save a reference to the first folder to the second account, wherein changes to the embedded folder view are synchronized with the reference to the first folder in the second account.

2. The method of claim 1, wherein responsive to receiving the request, causing, by the computing device, the content management system to save the reference to the first folder to the second account comprises:
  adding first content item, as published in the embedded folder view, to the second account, wherein a published version of the first content item is different from the first content item.

3. The method of claim 1, wherein determining, by the computing device, that the second user of the computing device has the second account with the content management system based on the login information associated with the second account comprises:
  determining that the second user is logged into the second account.

4. The method of claim 1, further comprising:
  creating, by the computing device, a second folder in a local file system of the computing device, the second folder corresponding to a shared folder and where the second user is allowed read-only access to the second folder and the second folder is synchronized with the first folder when new content is added to the first folder.

5. The method of claim 4, further comprising:
  restricting, by the computing device, user access to the second folder to read-only access; and
  synchronizing, by the computing device, content items in the second folder with content items in the first folder when the new content is added to the first folder.

6. A non-transitory computer-readable medium including one or more sequences of instructions that, when executed by one or more processors, causes:
  receiving, at a computing device via a web browser, a web page from a third party server having embed code for presenting an embedded folder view of a first folder on the web page from the third party server, the first folder corresponding to in a first account of a content management system corresponding to a first user, where the third party server is distinct from the content management system;
  executing, by the computing device, the embed code to request the embedded folder view of the first folder from the content management system;
  determining, by the computing device, that a second user of the computing device has a second account with the content management system based on login information associated with the second account;
  rendering, by the computing device, the web page including the embedded folder view of the first folder, where the embedded folder view presents representations of content items in the first folder in the content management system on the web page hosted by the third party server and wherein the embedded folder view includes a graphical element for adding a content item to the second account of the second user;
  presenting, by the computing device, the web page hosted by the third party server, the web page comprising the embedded folder view of the first folder;
  receiving, by the computing device, state update information for the embedded folder view from the content management system responsive to an owner of the first account modifying content contained in the first folder, the state update information describing a modified state of the first folder as a result of the owner modifying content contained therein;
  updating, by the computing device, the embedded folder view on the web page by synchronizing the embedded folder view with the modified state of the first folder in the content management system;
  receiving, by the computing device, a request from the second user to join a published version of the first folder; and
  responsive to receiving the request, causing, by the computing device, the content management system to save a reference to the first folder to the second account, wherein changes to the embedded folder view are synchronized with the reference to the first folder in the second account.

7. The non-transitory computer-readable medium of claim 6, wherein the second user is allowed access to a shared folder according to permissions configured for the shared folder by the first user.

8. The non-transitory computer-readable medium of claim 7, wherein the permissions configured for the shared folder allow the second user read-only access to the shared folder and where the shared folder is automatically synchronized with the first folder.

9. The non-transitory computer-readable medium of claim 7, wherein the permissions configured for the shared folder allow the second user read-write access to the shared folder and where the shared folder is automatically synchronized with the first folder.

10. The non-transitory computer-readable medium of claim 6, wherein the instructions cause:
  creating, by the computing device, a second folder in a local file system of the computing device, the second folder corresponding to a shared folder and where the second user is allowed read-only access to the second folder and the second folder is synchronized with the first folder when new content is added to the first folder.

11. The non-transitory computer-readable medium of claim 10, wherein the instructions cause:
  restricting, by the computing device, user access to the second folder to read-only access; and
  synchronizing, by the computing device, content items in the second folder with content items in the first folder when the new content is added to the first folder.

12. A system comprising:
  one or more processors; and
  a non-transitory computer-readable medium including one or more sequences of instructions that, when executed by the one or more processors, causes:
  receiving, at a computing device via a web browser, a web page from a third party server having embed code for presenting an embedded folder view of a first folder on the web page from the third party server, the first folder corresponding to a first account of a content management system corresponding to a first user, where the third party server is distinct from the content management system;
  executing, by the computing device, the embed code to request the embedded folder view of the first folder from the content management system;
  determining, by the computing device, that a second user of the computing device has a second account with the content management system based on login information;
  rendering, by the computing device, the web page including the embedded folder view of the first folder, where the embedded folder view presents representations of content items in the first folder in the content management system on the web page hosted by the third party server and wherein the embedded folder view includes a graphical element for adding a content item to the second account of the second user;

presenting, by the computing device, the web page hosted by the third party server, the web page comprising the embedded folder view of the first folder;

receiving, by the computing device, state update information for the embedded folder view from the content management system responsive to an owner of the first account modifying content contained in the first folder, the state update information describing a modified state of the first folder as a result of the owner modifying content contained therein;

updating, by the computing device, the embedded folder view on the web page by synchronizing the embedded folder view with the modified state of the first folder in the content management system;

receiving, by the computing device, a request from the second user to join a published version of the first folder; and responsive to receiving the request, causing, by the computing device, the content management system to save a reference to the first folder to the second account, wherein changes to the embedded folder view are synchronized with the reference to the first folder in the second account.

13. The system of claim 12, wherein the second user is allowed access to a shared folder according to permissions configured for the shared folder by the first user.

14. The system of claim 13, wherein the permissions configured for the shared folder allow the second user read-only access to the shared folder and where the shared folder is automatically synchronized with the first folder.

15. The system of claim 13, wherein the permissions configured for the shared folder allow the second user read-write access to the shared folder and where the shared folder is automatically synchronized with the first folder.

16. The system of claim 12, wherein the instructions cause:

creating, by the computing device, a second folder in a local file system of the computing device, the second folder corresponding to a shared folder and where the second user is allowed read-only access to the second folder and the second folder is synchronized with the first folder when new content is added to the first folder.

17. The system of claim 16, wherein the instructions cause:

restricting, by the computing device, user access to the second folder to read-only access; and synchronizing, by the computing device, content items in the second folder with content items in the first folder when the new content is added to the first folder.

* * * * *